Oct. 4, 1949.  P. R. GJERTSEN  2,483,997

HONING TOOL

Filed April 24, 1947

INVENTOR.
PAUL R. GJERTSEN
BY
ATT'YS

Patented Oct. 4, 1949

2,483,997

UNITED STATES PATENT OFFICE 2,483,997

HONING TOOL

Paul R. Gjertsen, Detroit, Mich., assignor to Ex-Cell-O Corporation, Detroit, Mich., a corporation of Michigan Application April 24, 1947, Serial No. 743,544

15 Claims. (Cl. 51—184.3)

The present invention relates to abrading, honing or lapping tools, of the general type disclosed in my Patent No. 2,268,479, issued December 30, 1941, and comprising a plurality of peripherally spaced cutting elements or stones jointly adjustable in one direction or the other along an intermediate holder or expanding member so as to vary the effective cutting diameter.

One of the objects of the present invention is to provide a honing tool of the foregoing character in which the cutting elements may be readily mounted on and removed from the expanding member to facilitate assembly and replacement, and when assembled are normally held resiliently at both ends against the respective actuating surfaces of the member in all positions of relative adjustment.

Another object is to provide a honing tool in which the cutting elements are adapted to be contracted in effective diameter so as to facilitate insertion into a work bore, and then are automatically expansible under constant pressure contact with the bore surface and as the honing operation progresses to final size.

A further object is to provide a honing tool as a fully self-contained structure adapted for connection to a rotary drive element of a machine tool, which structure includes size adjusting means and a longitudinally yieldable coupling between the adjusting means and the cutting elements, said coupling being automatically operative to expand the cutting elements radially to final sizes.

Another object is to provide a honing tool in which the yieldable coupling includes a spring actuated member normally biased into a stop position, and connected through push-pull links respectively to the contiguous ends of the cutting elements.

A further object is to provide a self-contained radially-expansible honing tool which is connected through a flexible shaft to a rotary drive element.

Other objects and advantages will become apparent as the description proceeds.

In the accompanying drawings.

Figure 3:
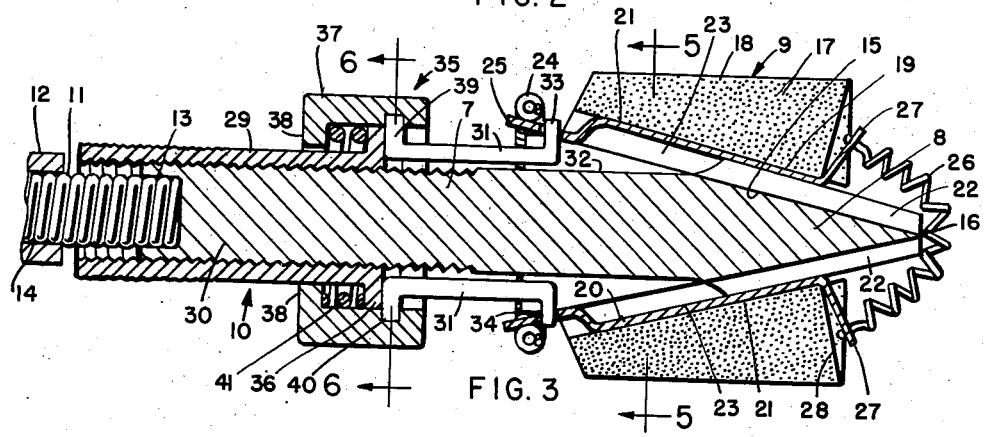
Fig. 3 is a fragmentary axial sectional view on an enlarged scale taken respectively along line 3—3 of Fig. 1 and showing the tool adjusted to substantial maximum size.
Figure 4:
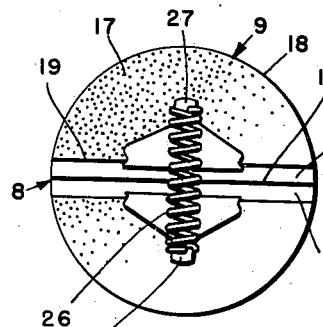
Fig. 4 is an outer end view of the tool.
Figure 5:
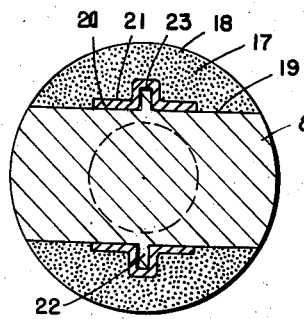
Figure 6:
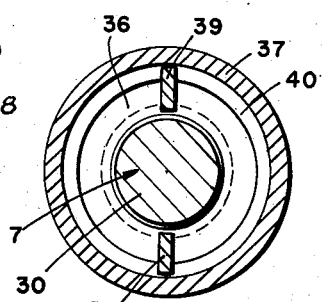

Figs. 5 and 6 are fragmentary transverse sectional views taken respectively along lines 5—5 and 6—6 of Fig. 3.

Figure 7:
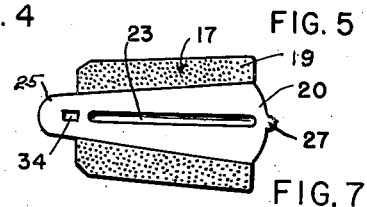

Fig. 7 is an inner face view of one of the cutting elements.

Figure 1:
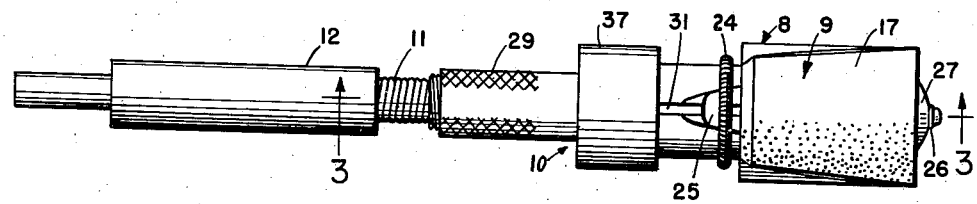
Figure 1 is a side elevational view in one longitudinal plane of a honing tool embodying the features of the present invention.
Figure 2:
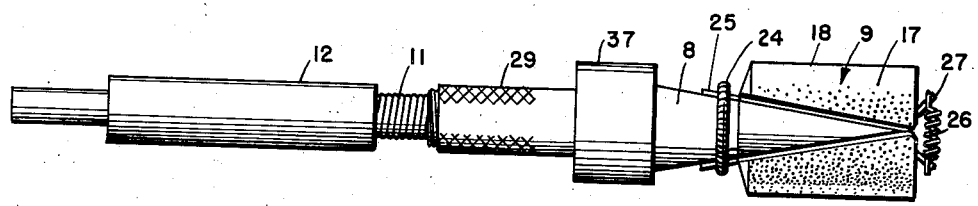
Fig. 2 is a view similar to Fig. 1, but in a perpendicular longitudinal plane.

Referring more particularly to the drawings, the hone, lap or abrading tool, constituting the exemplary embodiment of the present invention, and as shown in Figs. 1 and 2, comprises a self-contained unit which is adapted to be removably mounted in a supporting drive element (not shown) of a machine tool, and which is automatically self-expansible to a predetermined adjustable maximum circle of revolution.

The hone assembly, in more detail but generally, comprises an elongated holder or expanding member, preferably in the form of a shank or rod 7, which is connected or adapted for connection at one end to the aforesaid drive element, and which at the other end is provided with an enlarged head tapered outwardly to provide a wedge member 8, a plurality of uniformly peripherally spaced honing, lapping or abrading devices 9 slidably associated with the holder, and size adjusting means, indicated generally at 10, adjustably mounted on the rod, and operatively connected to the honing devices to urge the latter jointly and yieldably along the holder in a direction to effect progressive radial expansion of the cutting diameter to a predetermined maximum dimension as permitted by the progress of the cutting action.

Although the tool is especially adapted for producing fine surface finishes, it is capable of use for various cutting operations, such as honing, lapping or abrading depending on the character of the cutting elements, and these terms as used herein are, therefore, to be taken as generally synonymous.

In the preferred form, the inner end of the rod 7 is operatively connected for a yieldable torsion drive through a flexible coupling or shaft 11 to a generally axially aligned drive spindle or arbor 12. The flexible coupling 11 may be of any suitable character, and, as shown, consists of a closely wound spring wire securely anchored at opposite ends respectively in axial bores 13 and 14 in the opposed ends of the rod 7 and spindle 12.

The wedge member 8, at the outer end of the rod 7, is of generally cylindrical shape formed with a plurality of peripherally spaced tapering wedge surfaces 15, corresponding in number to the honing devices 9.

Preferably, two diametrically opposed honing devices 9 are employed, and in this instance the wedge member 8 is formed with two oppositely disposed surfaces 15 which slope gently and uniformly to a relatively thin diametrical edge 16 at the outer end.

Each honing device 9 comprises a cutting element or stone 17 of suitable material, such as a fine cutting bonded abrasive. The element 17 has an outer active face 18 of sectional cylindrical contour, and a flat inner mounting face 19 angularly related to the active face at an angle complemental to the angle of slope of the surfaces 15. Preferably, the honing element 17 is provided on the flat face 19 with a holder or shoe 20 which comprises a flat plate made of thin gauge sheet metal or other suitable wearing material. The shoe 20 is somewhat longer than the element 17, and of varying and slightly less width than the face 19. In the present instance, the shoe 20 is secured by means of a suitable adhesive as an insert in a central longitudinal recess 21 in the face 19 so as to be flush therewith.

A sliding spline connection is provided between the wedge member 8 and each honing device 9 to constrain the latter against lateral displacement while permitting relative longitudinal adjustment on the related wedge surface 15. This connection may consist of a longitudinal key or rib 22 on one of the parts and a complemental groove 23 in the other part. In the present instance the rib 22 is formed medially on the surface 15, and the shoe 20 is formed with a central offset to define the groove 23.

The two honing devices 9 are yieldably confined against the wedge surfaces 15 in all positions of adjustment. The preferred means for this purpose comprises a garter spring 24 resiliently engaging over the inner ends of the shoes 20 which extend beyond the elements 17 to define anchor lugs 25, and a coiled tension spring 26 flexed across the edge 16 of the wedge member 8, and anchored at opposite ends respectively to projecting lugs 27 on the outer ends of the shoes. The lugs 27 are struck outwardly at an angle to the respective planes of the shoes 20 to lie in concave recesses 28 having surfaces of conical segmental shape in the large ends of the elements 17. It will be evident that both of the springs 24 and 26 are disengageable from the lugs 25 and 27 to permit removal and replacement of the honing devices 9, and that they facilitate convenient assembly of the tool. Also, the springs 24 and 26, and particularly the latter due to its longitudinally exerted force, tend normally to urge the honing devices 9 longitudinally outwardly toward their position of minimum tool diameter.

The stone actuating or adjusting means 10, within the broad aspects of the invention, may be of any suitable character adapted to effect longitudinal shifting movement of the wedge member 8 relative to the honing devices 9 in opposition to the action of the springs 24 and 26. In the present instance, the adjusting means 10 is integrated with the other elements of the tool as a part thereof, and without dependence upon some external actuator, thus rendering the tool a fully self-contained structure which may be simply attached to the drive element of a machine tool for rotary drive, and, when required, for feed translation or reciprocation. More particularly, an elongated internally-threaded sleeve 29, constituting an outer screw element or nut, is rotatably adjustable on a threaded portion on the inner end of the rod 7, constituting an internal screw element 30, and is connected through longitudinal drag links 31 to the lugs 25 of the devices 9. Preferably, the links 31 are provided in the form of wires slidably confined in longitudinal grooves 32 formed in the base portion of the wedge member 8 in alignment with the ribs 22, and having outer ends 33 bent radially outwardly to extend disengageably through apertures 34 in the lugs 25. The grooves 32 extend in depth approximately to the diameter of the rod 7.

An axially yieldable coupling 35 preferably is interposed between the nut element 29 and the drag links 31, and may be manually actuated initially to shift the devices 9 into a position of reduced diameter so as to permit the tool to be inserted freely into the bore of the work to be machined. The coupling 35 then is automatically operable in response to spring pressure to shift the devices 9 in the reverse direction, so as to maintain pressure contact with the work, and, as the cutting operation progresses, to expand the tool diameter to the final size determined by the setting of the sleeve nut 29. In the preferred form of coupling 35, the sleeve nut 29 is formed on the outer end with an external peripheral flange 36. An actuating sleeve 37 is axially slidable on the flange 36, and has an internal peripheral end flange 38 in spaced opposed relation thereto. The hooks 31 have inner ends 39 bent radially outwardly and removably engageable in an internal annular groove 40 in the sleeve 37. A coiled compression spring 41 is operatively disposed about the sleeve 29 between and in end abutment with the flanges 36 and 38, and tends to drag the links 31 inwardly toward and into stop engagement with the flange 36. The hooks 31 thus are of the double end push-pull type.

In operation, the sleeve nut 29 is rotated on the screw rod 7 for selective adjustment of the tool diameter. Normally, the coupling 35 serves to maintain the ends 39 of the hooks 31 against the stop flange 36 to locate the honing devices 9 in position of maximum permissible expansion as shown in Fig. 3. To condition the tool for insertion in the work bore, the sleeve 37 is manually shifted to compress the spring 41 and push the hooks 31 outwardly, thereby moving the devices 9 convergingly along the taper wedge surfaces 15 to contract the tool. After insertion of the contracted tool into the work bore, the sleeve 37 is released, and thereupon the spring 41 acts to effect expansion of the honing devices 9 into pressure contact with the work surface. The spring 41 continues to expand the devices 9 as the lapping or abrading action progresses until the hooks 31 are pulled into engagement with the stop flange 36 which occurs when the work surface has been finished to the desired size.

The structure facilitates convenient assembly of the tool. Thus, the ends 39 of the hooks are inserted in the groove 40, and the spring 26 is engaged with the lugs 27. Then, the honing devices 9 are positioned on the opposed wedge surfaces 15, and engaged with the outer ends 33 of the hooks 31 to establish the drag link connection between the devices and the coupling sleeve 35. Finally, the garter spring 24 is engaged over the lugs 25 to retain the parts in assembled relation.

I claim as my invention:

1. A honing tool comprising, in combination, an elongated rod having an internal screw element formed on one end portion and having on the other end portion an enlarged head formed on diametrically opposite sides with equally and oppositely inclined wedge surfaces tapering gradually and uniformly to a thin diametrical edge, each of said surfaces having a longitudinal medial upstanding rib of uniform width and height and being formed in the base end with a groove in alinement with the rib and extending in depth to the diameter of said rod, two honing devices slidably mounted for longitudinal adjustment respectively on said wedge surfaces, each honing device having an outer partially cylindrical active face and an inner flat face inclined to the axis of said active face at the angle of slope of the associated wedge surface and having a metal shoe secured as an insert in said flat face formed with a longitudinal medial groove slidably engaging the associated rib, a tension spring extending across the tapered end edge of said head and connected at opposite ends to the outer ends of said shoes, a garter spring engaging over the innermost ends of said shoes, a nut element adjustably threaded on said screw element and having an external peripheral flange defining a stop shoulder, a sleeve slidable on said flange and formed with an internal peripheral groove outwardly thereof and with an internal annular flange disposed in opposed relation to said first mentioned flange, a plurality of longitudinal hooks removably engageable at opposite ends respectively in said groove and with the contiguous ends of said shoes, and a coiled compression spring interposed between said flanges about said screw element.

2. A honing tool comprising, in combination, an elongated rod having an internal screw element formed on one end portion and having on the other end portion an enlarged head formed on diametrically opposite sides with equally and oppositely inclined wedge surfaces tapering gradually and uniformly to a diametrical edge, each of said surfaces having a longitudinal medial upstanding rib and being formed in the base end with a groove in alinement with the rib, two honing devices slidably mounted for longitudinal adjustment respectively on said wedge surfaces, each honing device having an outer partially cylindrical active face and an inner flat face inclined to the axis of the active face at the angle of slope of the associated wedge surface and having a wear shoe secured to said flat face and formed with a longitudinal medial groove slidably engaging the associated rib, a tension spring extending across the tapered end edge of said head and connected at opposite ends to the outermost ends of said shoes, a garter spring engaging over the innermost ends of said shoes, a nut element adjustably threaded on said screw element and having a peripheral flange defining a stop shoulder, a sleeve slidable on said flange and formed with an internal peripheral groove outwardly thereof and with an internal annular flange disposed in opposed relation to said first mentioned flange, a plurality of longitudinal hooks removably engageable at opposite ends respectively in said groove and with the contiguous ends of said shoes, and a coiled compression spring interposed between said flanges about said screw element.

3. A honing tool comprising, in combination, an elongated rod having an internal screw element formed on one end portion and having on the other end portion an enlarged head formed on diametrically opposite sides with equally and oppositely inclined wedge surfaces tapering gradually and uniformly to a diametrical edge, each of said surfaces having a longitudinal medial upstanding rib and being formed in the base end with a groove in alinement with the rib, two honing devices slidably mounted for longitudinal adjustment respectively on said wedge surfaces, each honing device having an outer partially cylindrical active face and an inner flat face inclined to the axis of the active face at the angle of slope of the associated wedge surface and having a wear shoe secured to said flat face and formed with a longitudinal medial groove slidably engaging the associated rib, a tension spring extending across the tapered end edge of said head and connected at opposite ends to the outermost ends of said shoes, a garter spring engaging over the innermost ends of said shoes, and size adjusting means mounted on said screw element for adjustment axially of said rod and having push-pull connections with said shoes.

4. A honing tool comprising, in combination, an elongated rod having on one end portion an enlarged head formed on diametrically opposite sides with equally and oppositely inclined wedge surfaces tapering gradually and uniformly to a diametrical edge, two honing devices slidably mounted for longitudinal adjustment respectively on said wedge surfaces, each honing device having an outer partially cylindrical active face and an inner flat face inclined to the axis of the active face at the angle of slope of the associated wedge surface, spring means for maintaining said devices against said wedge surfaces, a nut element adjustably threaded on said rod, a sleeve slidable on said nut element, opposed flanges on said nut element and sleeve, a plurality of longitudinal drag links connecting said sleeve and said devices, and a coiled compression spring interposed between said flanges.

5. A honing tool comprising in combination an elongated rod having on one end formed on diametrically opposite sides with equally and oppositely inclined wedge surfaces tapering gradually and uniformly to a diametrical edge, two honing devices slidably mounted for longitudinal adjustment respectively on said wedge surfaces, each honing device having an outer partially cylindrical active face and an inner inclined flat face and having a metal shoe secured to said flat face and projecting beyond opposite ends thereof, a tension spring extending across the end edge of said head and connected at opposite ends to the outermost ends of said shoes, a garter spring engaging over the innermost ends of said shoes, and size adjusting means longitudinally adjustable on said rod and connected to the innermost ends of said shoes.

6. A honing tool comprising in combination an elongated rod having on one end a head formed on diametrically opposite sides with equally and oppositely inclined wedge surfaces tapering gradually and uniformly to a diametrical edge, two honing devices slidably mounted for longitudinal adjustment respectively on said wedge surfaces, each honing device having an outer partially cylindrical active face and an inner inclined flat face and having a metal shoe secured to said flat face and projecting beyond opposite ends thereof, a tension spring extending across the end edge of said head and connected at opposite ends to the outermost ends of said shoes, a garter spring engaging over the innermost ends of said shoes, and size adjusting means longitudinally adjustable on said rod and having an axially yieldable coupling anchored to said devices, said coupling defining a positive stop position and being resiliently displaceable out of said position to reduce the effective cutting diameter of said devices.

7. A honing tool comprising in combination an elongated rod having a head on one end formed with an inclined wedge surface, a honing device slidably mounted for longitudinal adjustment on said wedge surface, and having an outer partially cylindrical active face and an inner inclined flat face and a metal shoe secured to said flat face, spring means for maintaining said shoe against said surface, and size adjusting means longitudinally adjustable on said rod and having an axially yieldable coupling anchored to said device, said coupling defining a positive stop position and being resiliently displaceable out of said position to reduce the effective cutting diameter of said devices.

8. A cutting element for a rotary honing tool comprising a body of bonded abrasive material shaped as a secantial segment of a cylinder, the plane of the secant cord being angular with respect to the axis of curvature of the cylindrical surface to provide a body of tapered width, the plane face of said body being longitudinally traversed by a groove having uniform width and uniform depth throughout its length, the narrow end of said body being chamfered to define the shape of a conical segment and the large end of said body being recessed to define the shape of a conical segment, a shoe secured as an insert in the flat face of said body and having a longitudinal rib offset inwardly to interfit with said groove, one end of said shoe projecting beyond the narrow end of said body to define an apertured lug, the other end of said shoe projecting beyond the large end of said body and being struck out angularly into said recess to define a second anchor lug.

9. A cutting element for a honing tool comprising a body shaped as a secantial segment of a cylinder, the plane of the secant cord being angular with respect to the axis of curvature of a cylindrical surface to provide a body of tapered width, the plane face of said body being longitudinally traversed by guide means, the arcuate edge of the narrow end of said body being chamfered and the large end of said body being concavely recessed about said axis, a shoe secured to the flat face of said body and being formed to interfit with and provide a wearing surface for said guide means, one end of said shoe projecting beyond the narrow end of said body to define an anchor lug, the other end of said shoe projecting beyond the large end of said body into said recess to define a second anchor lug.

10. A cutting element for a honing tool comprising a body shaped as a secantial segment of a cylinder, the plane of the secant cord being angular with respect to the axis of curvature of the cylindrical surface to provide a body of tapered width, the plane face of the body being longitudinally traversed by guide means, the arcuate edge of the narrow end of said body being chamfered and the large end of said body being concavely recessed about said axis.

11. A cutting element for a honing tool comprising a body of bonded abrasive material shaped as a secantial segment of a cylinder, the plane of the secant cord being angular with respect to the axis of curvature of the cylindrical surface to provide a body of tapered width, the plane face of said body being longitudinally traversed by a groove having uniform width and uniform depth throughout its length, the narrow end of said body being chamfered to define the shape of a conical segment and the large end of said body being concavely recessed about said axis to define the shape of a conical segment.

12. A shoe for supporting the cutting element of a honing tool comprising an elongated plate having flat side marginal portions in substantially the same plane, and an intermediate longitudinally extending portion providing a medial rib on one side and a groove in the other side, one end of said plate being apertured to define an anchor lug, the other end of said plate being struck out at an angle to the rib side of said plate to define a second anchor lug.

13. An expanding member for the cutting elements of a honing tool comprising an elongated rod having a threaded portion on one end to constitute a screw element and having on the other end an enlarged head formed with a plurality of uniformly peripherally-spaced wedge surfaces tapering gradually and uniformly toward each other, each of the wedge surfaces having a longitudinal and medial guide means, the large end of said head being formed with longitudinal grooves having root surfaces parallel to the axis of said rod and being in alinement respectively with said guide means.

14. An expanding member for the cutting elements of a honing tool comprising an elongated rod having a threaded portion on one end to constitute a screw element and having on the other end an enlarged head formed with a plurality of uniformly peripherally-spaced wedge surfaces tapering gradually and uniformly toward each other, each of the wedge surfaces having a longitudinal and medial guide means, the large end of said head being formed with longitudinal grooves having root surfaces parallel to the axis of said rod and being in alinement respectively with said guide means, a spindle in axial alinement with said rod, and a flexible torsion shaft connecting said spindle and rod.

15. An expanding member for the cutting elements of a rotary honing tool comprising an elongated rod having a threaded portion on one end to constitute a screw element and having on the other end an enlarged head formed on diametrically opposite sides with equally and oppositely inclined wedge surfaces tapering gradually and uniformly to a thin diametrical edge, each of the wedge surfaces having a longitudinal medial upstanding rib of uniform width and height, the large end of said head being formed in diametrically opposite sides and in depth to the diameter of said rod with longitudinal grooves in alinement with said ribs.

PAUL R. GJERTSEN.

REFERENCES CITED

The following references are of record in the file of this patent:

UNITED STATES PATENTS

| Number | Name | Date |
|---|---|---|
| 1,821,518 | Jeschke | Sept. 1, 1931 |
| 1,908,218 | Calvert | May 9, 1933 |
| 2,263,781 | Kline | Nov. 25, 1941 |
| 2,268,479 | Gjertsen | Dec. 30, 1941 |
| 2,286,360 | Gjertsen | June 16, 1942 |
| 2,412,419 | Palotsee | Dec. 10, 1946 |
| 2,422,434 | Palotsee | June 17, 1947 |